United States Patent
Yamamoto et al.

[11] Patent Number: 6,019,296
[45] Date of Patent: Feb. 1, 2000

[54] FUEL INJECTOR FOR AN INTERNAL COMBUSTION ENGINE

[75] Inventors: Yasuhiro Yamamoto, Chiryu; Tomoji Isikawa, Okazaki; Akinori Saito, Aichi-ken, all of Japan

[73] Assignee: Toyota Jidosha Kabushiki Kaisha, Toyota, Japan

[21] Appl. No.: 09/170,161

[22] Filed: Oct. 13, 1998

[30] Foreign Application Priority Data

Nov. 19, 1997 [JP] Japan .................................. 9-318537

[51] Int. Cl.$^7$ ........................................................ B05B 1/30
[52] U.S. Cl. ........................................................ 239/533.2
[58] Field of Search ............................. 239/533.2, 533.3, 239/533.7, 533.8, 533.9, 533.12; 251/123

[56] References Cited

U.S. PATENT DOCUMENTS

| | | |
|---|---|---|
| 1,569,448 | 1/1926 | Banner . |
| 4,177,948 | 12/1979 | Schaffitz et al. ............... 239/533.3 |
| 4,566,634 | 1/1986 | Wiegand ...................... 239/533.12 |
| 5,346,137 | 9/1994 | Okamoto et al. .............. 239/585.4 |
| 5,353,992 | 10/1994 | Regueiro ..................... 239/533.12 |
| 5,772,124 | 6/1998 | Tamaki et al. ............... 239/533.12 |

FOREIGN PATENT DOCUMENTS

| | | |
|---|---|---|
| 0 742 366 A1 | 11/1996 | European Pat. Off. . |
| 793.863 | 2/1936 | France . |
| 2 375 451 | 7/1978 | France . |
| 42 03 343 C1 | 5/1993 | Germany . |
| 59-087271 | 5/1984 | Japan . |
| 3-78562 | 4/1991 | Japan . |

*Primary Examiner*—Andres Kashnikow
*Assistant Examiner*—Davis Hwu
*Attorney, Agent, or Firm*—Oliff & Berridge, PLC

[57] ABSTRACT

A fuel injector comprises an injection hole and a valve body. The width of the injection hole is gradually narrowed inward at a predetermined contained angle. The width of the opening on the outer side of the injection hole is sufficiently larger than the height thereof. A fuel reservoir on the downstream side of the seat portion of the valve body is connected to the injection hole via a fuel adjusting passage. The fuel adjusting passage has a uniform passage cross section.

12 Claims, 5 Drawing Sheets

FUEL INJECTOR FOR AN INTERNAL COMBUSTION ENGINE

BACKGROUND OF THE INVENTION

1. Field of the Invention

The present invention relates to a fuel injector for an internal combustion engine.

2. Description of the Related Art

In Japanese Unexamined Patent Publication No. 3-78562, the injection hole of a fuel injector is formed as a slit. The injection hole has a height which is relatively small and is nearly uniform, and has a width which is gradually narrowed inward at a predetermined contained angle. Therefore, the injected fuel assumes the form of a flat triangular spray having a relatively small thickness. In the fuel spray of such a triangular shape, almost all fuel comes into sufficient contact with the air and is favorably atomized. The injection hole is directly communicated with the fuel reservoir on the downstream side of the seat portion of the valve body. The fuel is injected through the injection hole as the pressure of fuel in the fuel reservoir is increased.

In the above-mentioned fuel injector, the contained angle of the triangular fuel spray is limited by the contained angle of the injection hole, and the amount of fuel injected with the triangular fuel spray per unit time, i.e., the flow rate of the fuel, is limited by the area of the injection hole which is opened to the fuel reservoir since the injection hole is directly communicated with the fuel reservoir. In this fuel injector, when the contained angle of the injection hole is increased, the area of the injection hole opened to the fuel reservoir increases and thus the flow rate of the fuel increases. Conversely when the contained angle of the injection hole is decreased, the area of the injection hole opened to the fuel reservoir decreases and thus the flow rate of the fuel decreases.

In the above-mentioned fuel injector, therefore, the area of the injection hole opened to the fuel reservoir is set such that a desired flow rate of the fuel is realized, and then the contained angle of the injection hole is set such that the opening area is realized. Due to tolerance in the machining and the like, however, it is difficult to provide the contained angle of the injection hole as desired. Even a small difference between the contained angle of the injection hole that is provided and the desired contained angle makes it difficult to realize the desired area of the injection hole opened to the fuel reservoir. Therefore, a desired flow rate of the fuel with the triangular fuel spray cannot be realized.

SUMMARY OF THE INVENTION

An object of the present invention, therefore, is to realize a desired flow rate of the fuel in the fuel injector for an internal combustion engine, which is capable of forming a nearly flat triangular fuel spray, even if the contained angle of the injection hole is not provided as desired due to tolerance in the machining and the like.

According to the present invention, there is provided a fuel injector for an internal combustion engine comprising an injection hole and a valve body, wherein the width of said injection hole is gradually narrowed inward at a predetermined contained angle, an opening on the outer side of said injection hole has a width sufficiently larger than the height thereof, a fuel reservoir on the downstream side of a seat portion of said valve body is connected to said injection hole via a fuel adjusting passage, and said fuel adjusting passage has a uniform passage cross section.

BRIEF DESCRIPTION OF THE DRAWINGS

In the drawings:

FIG. 8 is viewed from the direction of arrow B.

DESCRIPTION OF THE PREFERRED EMBODIMENT

Figure 1:
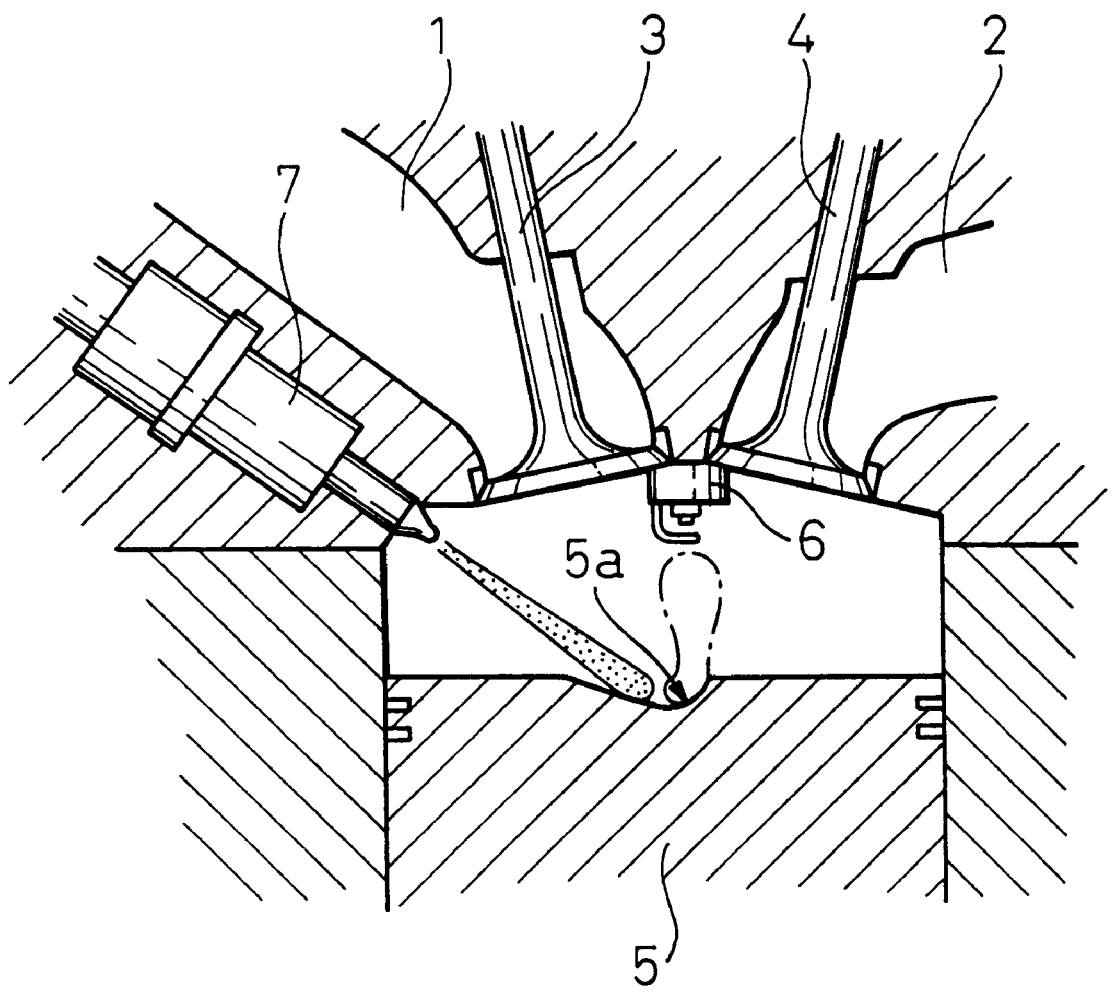
FIG. 1 is a schematic sectional view of direct cylinder injection-type spark-ignition internal combustion engine equipped with a fuel injector according to the present invention.

FIG. 1 is a schematic sectional view of a direct cylinder injection-type spark-ignition internal combustion engine equipped with a fuel injector 7 according to a first embodiment of the present invention. In FIG. 1, reference numeral 1 designates an intake port and reference numeral 2 designates an exhaust port. The intake port 1 is communicated with the cylinder via an intake valve 3, and the exhaust port 2 is communicated with the cylinder via an exhaust valve 4. Reference numeral 5 designates a piston, and reference numeral 6 designates a spark plug arranged in an upper part of the combustion chamber. The fuel injector 7 directly injects the fuel into the cylinder toward the top surface of the piston in the latter half of a compression stroke. In the top surface of the piston 5, a deflection groove 5a is formed to deflect the fuel injected by the fuel injector 7 toward the spark plug 6.

Figure 2:
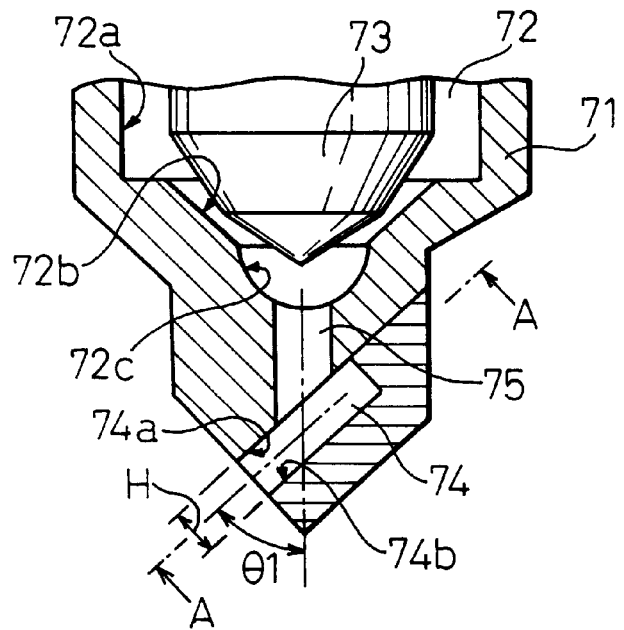
FIG. 2 is an enlarged sectional view of the vicinity of the injection hole in the fuel injector of FIG. 1.
Figure 3:
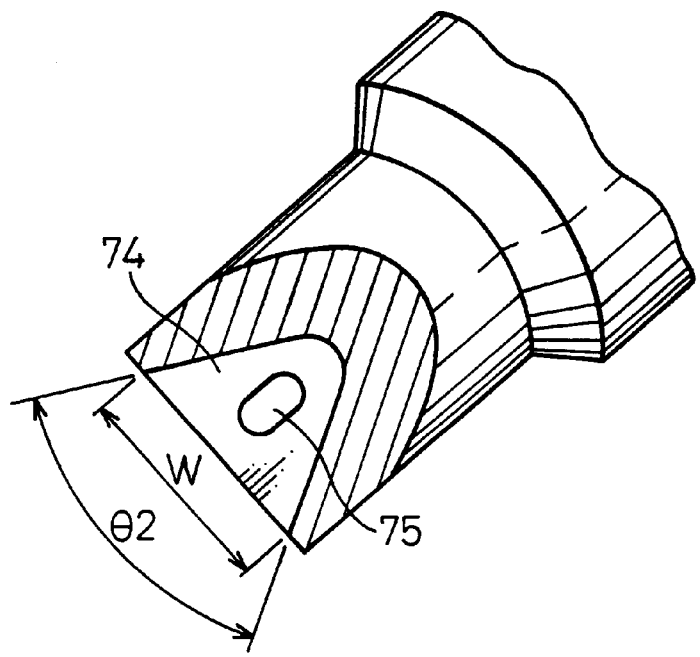
FIG. 3 is a sectional view along the line A—A in FIG. 2.

FIG. 2 is an enlarged sectional view of the vicinity of the injection hole of the fuel injector 7, and FIG. 3 is a sectional view along the line A—A in FIG. 2. In these drawings, reference numeral 71 designates an injector body. A fuel passage 72 is formed in the injector body 71. A valve body 73 is disposed in the fuel passage 72. The fuel passage 72 includes a large-diameter portion 72a located about the valve body 73, a nearly frustoconical seat portion 72b for closing the fuel passage 72 upon contact with the valve body 73, and a nearly semi-spherical fuel reservoir 72c located immediately on the downstream side of the seat portion 72b. The high pressure fuel is supplied to the large-diameter portion 72a of the fuel passage 72.

Reference numeral 74 designates an injection hole that extends so as to incline at a predetermined angle θ1 with respect to the center axis of the injector body 71. The height H of the injection hole 74 is nearly uniform at any position, and the width of the injection hole 74 is gradually narrowed inward at a predetermined contained angle. The width W of the opening on the outside of the injection hole 74 is sufficiently larger than the height H thereof. The side surface 74a in the direction of height of the thus formed injection hole 74 on the side of the fuel reservoir 72c is connected to the fuel reservoir 72c via a fuel adjusting passage 75.

The fuel adjusting passage 75 has a uniform passage cross section, and the passage sectional area of the fuel adjusting passage 75 is smaller than a minimum passage sectional area of the fuel reservoir 72c (i.e., a passage sectional area at a position on the immediately outside of the opening of the fuel adjusting passage 75) and is smaller than a minimum passage sectional area of the injection hole 74 (i.e., a passage sectional area at a position of a minimum width in contact with the opening of the fuel adjusting passage 75). Here, a passage is a path through which the fuel flows. The portion on the inside from the opening of the fuel adjusting passage 75 (on the side opposite to the opening of the outer side) in the injection hole 74 is merely filled with the fuel, and does not work as a path for the fuel, and is not included in a passage as will be described later in detail.

At the time of injecting the fuel as shown in FIG. 2, the valve body 73 is separated from the seat portion 72b, and the fuel passage 72 is opened. Therefore, the high pressure fuel is supplied from the large-diameter portion 72a of the fuel passage 72 into the fuel reservoir 72c via the seat portion 72b. Thereafter, the fuel reaches the injection hole 74 from the fuel reservoir 72c via the fuel adjusting passage 75. Thus, the fuel that has reached the injection hole 74 has a velocity component only in the axial direction of the fuel adjusting passage 75. The fuel then collides with the side surface 74b of the injection hole 74 opposed to the side surface 74a to which the fuel adjusting passage 75 is connected. At the beginning of injection, the fuel is diffused in all directions along the side surface 74b.

After the portion on the inside from the opening of the fuel adjusting passage 75 in the injection hole 74 is filed with the fuel directed thereto, which is part of the fuel diffused in all directions, the fuel that has collided with the side wall 74b is nearly equally imparted with velocity components in all directions within a predetermined contained angle θ2, and the fuel is injected through the opening on the outer side of the injection hole 74. When the fuel is thus injected, a triangular fuel spray is formed, which has a small thickness corresponding to the height H of the injection hole 74 and has a spray angle corresponding to the contained angle of the injection hole 74. Since the velocity components are nearly equal in all directions, every portion of the triangular fuel spray has a nearly equal degree of diffusion. In such a triangular fuel spray, all the fuel can come into sufficient contact with the air taken into the cylinder and can be favorably atomized.

When the fuel injector 7 is used for a direct cylinder injection-type spark-ignition internal combustion engine as shown in FIG. 1, the triangular spray formed by the injected fuel is deflected toward the spark plug 6 by the deflection groove 5a formed in the top surface of the piston as the fuel is injected in the compression stroke to accomplish a stratified combustion. The spray has a uniform and favorable degree of diffusion, so that a favorable stratified combustion can be realized. The thus formed fuel spray has a relatively small thickness. This makes it possible to increase the distance between the lowest piston position and the highest position of the piston where the fuel can be deflected toward the spark plug 6 by the deflection groove 5a in the top surface of the piston. Therefore, during this relatively long period fuel can be injected, so that a relatively large amount of fuel can be injected, and thus the region of stratified combustion can be expanded toward the high-load side. Even when the fuel injector 7 is used for a direct cylinder injection-type spark-ignition internal combustion engine in which the fuel injected in the compression stroke directly forms a stratified fuel mixture near the ignition plug, a favorable stratified combustion is realized owing to uniform and favorable degree of diffusion. Besides, the thickness of the fuel spray is relatively small, so that the injected fuel does not collide with the piston when the piston considerably approaches the top dead center and, thus, during a relatively long period, fuel can be injected. Therefore, a relatively large amount of fuel can be injected and the region of stratified combustion can be expanded toward the high-load side.

In direct cylinder injection-type spark-ignition internal combustion engine in which a combustion chamber of a recessed shape is formed in the top surface of the piston, the thickness of the fuel spray is relatively small, so that a distance between the lowest position and the highest position of the piston, where the injected fuel can all be introduced into the combustion chamber, increases. Therefore, a relatively large amount of fuel can be introduced into the combustion chamber, and the region of stratified combustion can be expanded toward the high-load side. Furthermore, the triangular fuel spray formed by the fuel injector 7 of the present embodiment has a uniform and favorable degree of diffusion inclusive of the two side portions as described above. That is, the triangular fuel spray is not excessively diffused at the both sides thereof, and the injected fuel can be reliably confined within a predetermined angle θ in the direction of the width. This is advantageous for reliably introducing all of the injected fuel into the combustion chamber in the direction of the width. Confining the injected fuel within the predetermined angle θ in the direction of the width is advantageous in injecting the fuel into an intended position when fuel is injected in an intake stroke in the direct cylinder injection-type spark-ignition internal combustion engine or an intake port injection-type internal combustion engine.

The flow rate of fuel (fuel injection rate) and the contained angle of the triangular fuel spray in the above-mentioned fuel injection, respectively, affect the distance the spray reaches, the particle diameter of the spray and the shape of the combustion chamber, and are often varied depending upon the internal combustion engine. For instance, it may be required to decrease the flow rate of the fuel but to increase the contained angle of spray. In the conventional fuel injector in which the injection hole is directly opened to the fuel reservoir, if the contained angle of the injection hole increases, the opening area thereof to the fuel reservoir increases, therefore the flow rate of the fuel increases in proportion to the opening area. Accordingly the conventional fuel injector is not capable of satisfying the above-mentioned requirement. According to the fuel injector 7 of the present embodiment, however, the passage sectional area of the fuel adjusting passage 75 is minimized in the path for the fuel and, hence, the flow rate of the fuel is limited only by the passage sectional area of the fuel adjusting passage 75. Therefore, if the fuel adjusting passage 75 is made so as to have a suitable passage sectional area for a desired flow rate of the fuel, the desired flow rate of the fuel is realized irrespective of the contained angle θ2 of the injection hole 74. On the other hand, the desired contained angle of spray is limited only by the contained angle θ2 of the injection hole 74. If the contained angle θ2 of the injection hole 74 is made so as to form a desired contained angle of spray, it is allowed to realize a desired contained angle of spray irrespective of the flow rate of the fuel. In connection with the thickness of the fuel spray, a desired thickness of spray can be realized irrespective of the flow rate of the fuel if the height H of the injection hole 74 is made a desired thickness of spray. Thus, the fuel injector of the present embodiment can meet any independent requirement such as the flow rate of the fuel, the contained angle of the spray and the thickness of the spray.

The fuel adjusting passage 75 of the present embodiment has a uniform passage cross section. Unlike the conventional fuel injector in which the injection hole is directly opened to the fuel reservoir, therefore, the area of the opening on the side of the fuel reservoir in the injection hole 74 always becomes the passage sectional area of the fuel adjusting passage 75 even if the contained angle θ2 of the injection hole 74 is deviated from a desired contained angle of spray due to tolerance in the machining and the like at the time of forming the injection hole 74. It is therefore possible to realize a desired flow rate of the fuel at all times.

Figure 4:
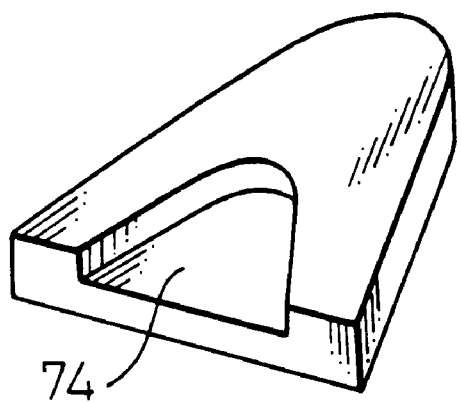
FIG. 4 is a perspective view of a tip portion of the injector body of FIG. 2.

In the fuel injector 7 of the present embodiment, the tip portion of the injector body 71 is divided as a separate member at a position of the side surface 74a in the direction of height of the injection hole 74 on the side of the fuel reservoir 72c. As shown in FIG. 4, therefore, the injection hole 74 can be formed as a recessed portion in the tip portion, making it possible to easily form the injection hole 74 of a relatively complex shape having a nearly triangular shape in cross section.

Figure 5:
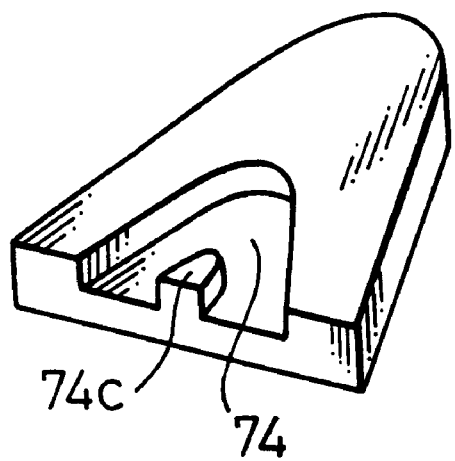
FIG. 5 is a view corresponding to FIG. 4 and illustrates a modification of the tip portion of the injector body.

FIG. 5 illustrates another shape of the tip portion of the injector body 71. In this tip portion, a protuberance 74c is formed nearly at the center in the opening on the outside of the injection hole 74 to partly close the injection hole 74. Since the tip portion is a separate member, the machining thereof can be carried out relatively easily. By forming the injection hole 74 as described above, no fuel exists at the center of the triangular fuel spray. At the time of guiding the fuel toward the spark plug 6 as described above, therefore, the fuel does not directly adhere to the ignition gap of the spark plug 6, and thus the spark plug 6 is prevented from misfiring.

Figure 6:
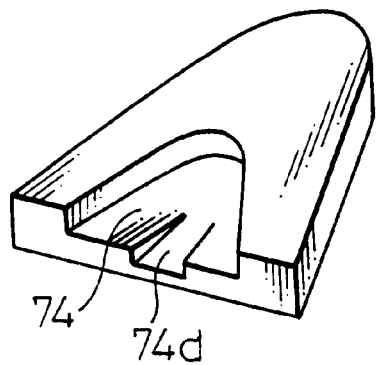
FIG. 6 is a view corresponding to FIG. 4 and illustrates another modification of the tip portion of the injector body.

FIG. 6 illustrates a further shape of the tip portion of the injector body 71. A groove 74d is formed in this tip portion nearly at the center in the opening on the outer side of the injection hole 74 in order to partly increase the height of the injection hole 74. Since the tip portion is a separate member, the machining thereof can be carried out relatively easily. By forming the injection hole 74 as described above, the center of the triangular fuel spray becomes relatively thick and, hence, the fuel exists in a relatively large amount correspondingly. In guiding the fuel toward the spark plug 6 as described above, therefore, the mixture gas is ignited more favorably near the spark plug 6, and thus more reliable ignition can be realized.

Figure 7:
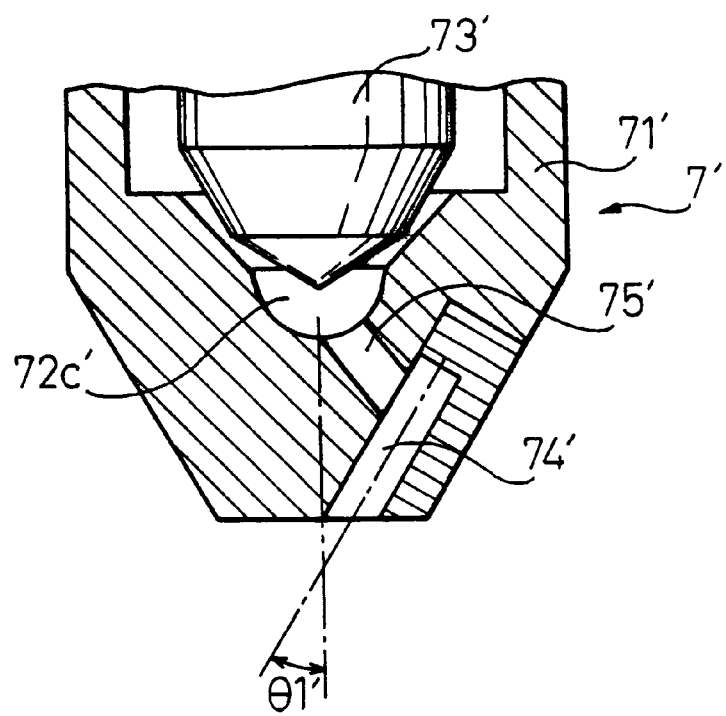
FIG. 7 is a view corresponding to FIG. 2 and illustrates another embodiment of the fuel injector.

FIG. 7 is a view corresponding to FIG. 2, and illustrates a modification of the fuel injector of the above-mentioned embodiment. The difference, compared to FIG. 2, is that a fuel adjusting passage 75' is inclined with respect to the center axis of the fuel injector, making it possible to decrease an angle θ1' of the injection hole 74' with respect to the center axis of the fuel injector. Thus, by the inclination of the fuel adjusting passage 75' with respect to the center axis of the fuel injection valve, the injection hole 74' can be freely directed with respect to the center axis of the fuel injector.

Figure 8:
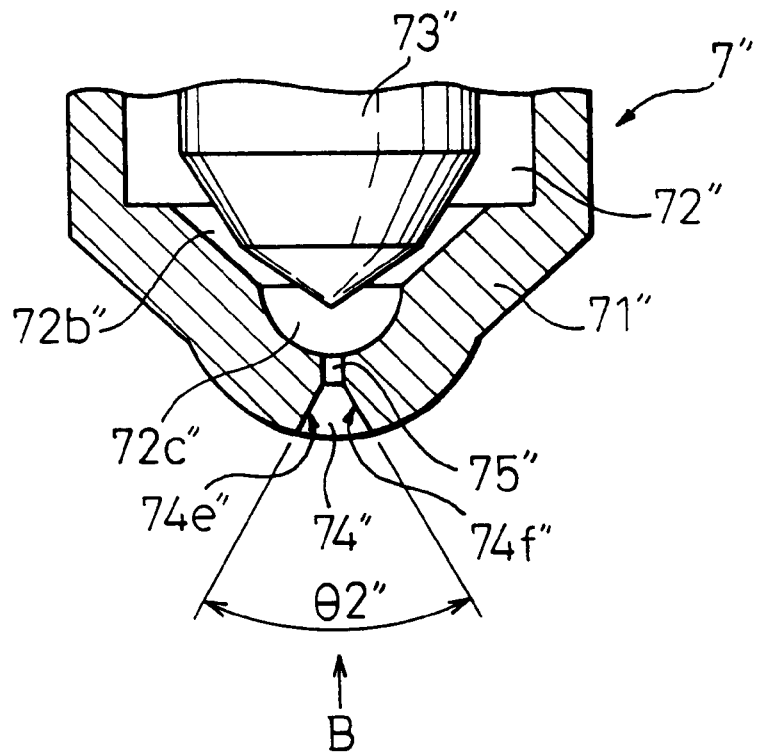
FIG. 8 is a view corresponding to FIG. 2 and illustrates a further embodiment of the fuel injector.
Figure 9:
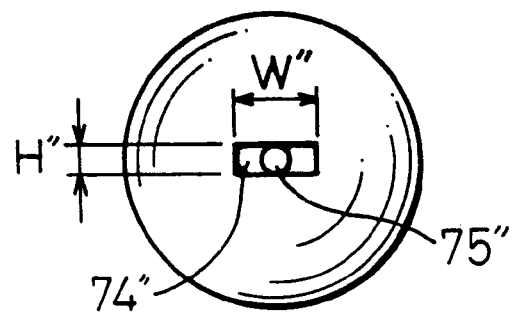
FIG. 9 is a view when

FIG. 8 illustrates a fuel injector valve according to another embodiment of the present invention, and FIG. 9 is a view when FIG. 8 is viewed from the direction of an arrow B. Described below are only the differences between the fuel injector and the fuel injectors shown in FIGS. 2 and 3. The fuel injector 7" of the present embodiment has a fuel adjusting passage 75" connected to a fuel reservoir 72c" and an injection hole 74" connected to the fuel adjusting passage 75", that are formed in the tip portion of an injector body 71". The fuel adjusting passage 75" has a uniform passage cross section.

The injection hole 74" has a height H" corresponding to the inner diameter of the fuel adjusting passage 75", and its width is gradually narrowed inward at a predetermined contained angle θ2", and the injection hole 74" terminates at the fuel adjusting passage 75". The opening on the outer side of the injection hole 74" has a width W" sufficiently larger than the height H" thereof.

In the thus constituted fuel injector 7", a valve body 73" is separated away from a seat portion 72b" at the time of injecting the fuel, and the fuel passage 72" is opened, enabling a high pressure fuel to be supplied to the fuel reservoir 72c". Thereafter, the fuel flows from the fuel reservoir 72c" via the fuel adjusting passage 75" to the injection hole 74", and is injected. In this case, the fuel that has passed through the fuel adjusting passage 75" spreads along the side surfaces 74e", 74f" of the injection hole 74" in the direction of width due to a drop in the pressure (Coanda effect) near the side surfaces 74e", 74f" of the injection hole 74". Therefore, the fuel spray injected from the injection hole 74" has a relatively small thickness corresponding to the height H" of the injection hole 74" and becomes a triangular fuel spray having a contained angle corresponding to the contained angle θ2" of the injection hole 74", whereby all the fuel comes into sufficient contact with the air taken into the cylinder and is favorably atomized.

In the fuel injector of the present embodiment also, the flow rate of the fuel is limited by the fuel adjusting passage 75" having a minimum passage sectional area, and the contained angle of the triangular fuel spray is limited by the contained angle θ2" of the injection hole 74", which, therefore, can be set independently of each other. Besides, a desired flow rate of the fuel is realized by the fuel adjusting passage 75" having a uniform passage cross section even if the contained angle of the injection hole is deviated from the desired contained angle of spray due to tolerance in the machining and the like at the time of forming the injection hole 74". The thickness of the spray is limited by the height H" of the injection hole 74". In the present embodiment, the height H" of the injection hole 74" corresponds to the inner diameter of the fuel adjusting passage 75", i.e., the height thereof. In order to change the thickness of the spray relative to the predetermined flow rate of the fuel while maintaining this relationship, the cross-sectional shape of the fuel adjusting passage 75" may be changed into an eclipse, an oval shape or a rectangle without changing the passage sectional area of the flow passage when the height H" of the injection hole 74" is changed. If the height H" of the injection hole 74" is increased to be larger than the height of the fuel adjusting passage 75", the thickness of the spray can be changed to correspond to the height H" of the injection hole 74" owing to the above-mentioned Coanda effect.

In the embodiments shown in FIGS. 2, 7 and 8, the height of the injection hole is a nearly uniform. However, this does not limit the present invention. If the height of the injection hole is very much smaller than the width thereof at the opening at least on the outer side of the injection hole, the height is not required to be uniform even in the opening on the outer side. In these embodiments, furthermore, the fuel adjusting passage is a nearly uniform and has a circular shape in cross section. However, this does not limit the present invention. A sectional shape other than a circular shape may be employed. What is important is that at least part of the fuel adjusting passage should have a minimum passage sectional area in the path for the fuel.

We claim:

1. A fuel injector, for an internal combustion engine, comprising an injection hole and a valve body, wherein the width of said injection hole is gradually narrowed inward at a predetermined contained angle, an opening on the outer side of said injection hole has a width sufficiently larger than the height thereof, a fuel reservoir on the downstream side of a seat portion of said valve body is connected to said injection hole via a fuel adjusting passage, and said fuel adjusting passage has a uniform passage cross section.

2. A fuel injector according to claim 1, wherein a passage sectional area of said fuel adjusting passage is smaller than a minimum passage sectional area of said fuel reservoir and than a minimum passage sectional area of said injection hole.

3. A fuel injector according to claim 1, wherein the center axis of said fuel adjusting passage intersects a cross section of said injection hole which is perpendicular to the direction of height of said injection hole.

4. A fuel injector according to claim 2, wherein the center axis of said fuel adjusting passage intersects a cross section of said injection hole which is perpendicular to the direction of height of said injection hole.

5. A fuel injector according to claim 3, wherein said injection hole is formed of a member which is divided into at least two in the direction of height of said injection hole.

6. A fuel injector according to claim 4, wherein said injection hole is formed of a member which is divided into at least two in the direction of height of said injection hole.

7. A fuel injector according to claim 1, wherein the height at the central portion of said opening on the outer side of said injection hole is larger than the height at both ends thereof.

8. A fuel injector according to claim 2, wherein the height at the central portion of said opening on the outer side of said injection hole is larger than the height at both ends thereof.

9. A fuel injector according to claim 3, wherein the height at the central portion of said opening on the outer side of said injection hole is larger than the height at both ends thereof.

10. A fuel injector according to claim 4, wherein the height at the central portion of said opening on the outer side of said injection hole is larger than the height at both ends thereof.

11. A fuel injector according to claim 5, wherein the height at the central portion of said opening on the outer side of said injection hole is larger than the height at both ends thereof.

12. A fuel injector according to claim 6, wherein the height at the central portion of said opening on the outer side of said injection hole is larger than the height at both ends thereof.

* * * * *